United States Patent
Metzgen

(10) Patent No.: US 7,443,846 B1
(45) Date of Patent: Oct. 28, 2008

(54) IMPLEMENTATION OF A MULTIPLEXER IN INTEGRATED CIRCUITRY

(75) Inventor: Paul J. Metzgen, London (GB)

(73) Assignee: Altera Corporation, San Jose, CA (US)

( * ) Notice: Subject to any disclaimer, the term of this patent is extended or adjusted under 35 U.S.C. 154(b) by 977 days.

(21) Appl. No.: 10/341,530

(22) Filed: Jan. 10, 2003

(51) Int. Cl.
*H04L 12/56* (2006.01)

(52) U.S. Cl. ............... 370/389; 716/16; 716/17; 326/39

(58) Field of Classification Search ............... None
See application file for complete search history.

(56) References Cited

U.S. PATENT DOCUMENTS

| | | | |
|---|---|---|---|
| 5,898,318 A * | 4/1999 | Pedersen | 326/39 |
| 6,099,583 A * | 8/2000 | Nag | 716/16 |
| 6,184,707 B1 * | 2/2001 | Norman et al. | 326/39 |
| 6,353,920 B1 * | 3/2002 | Wittig et al. | 716/16 |
| 6,505,337 B1 * | 1/2003 | Wittig et al. | 716/17 |
| 2003/0234667 A1 * | 12/2003 | Digari et al. | 326/39 |
| 2006/0176075 A1 * | 8/2006 | Or-Bach | 326/38 |

* cited by examiner

*Primary Examiner*—Chi H. Pham
*Assistant Examiner*—Albert T Chou
(74) *Attorney, Agent, or Firm*—Ropes & Gray LLP

(57) ABSTRACT

A smaller, faster implementation of a multiplexer is provided. Using an improved selection encoding, the multiplexer is implemented using LUTs that may be coupled to one another using a cascade connection structure. The improved selection encoding and cascade structure allow for one-hot selection, faster routing, and more efficient use of resources.

12 Claims, 7 Drawing Sheets

IMPLEMENTATION OF A MULTIPLEXER IN INTEGRATED CIRCUITRY

BACKGROUND OF THE INVENTION

The present invention relates to multiplexers, and more particularly, the present invention relates to an improved way of implementing multiplexers in integrated circuitry.

Multiplexers are well known elements used commonly in logic circuitry. Because of the prevalent use of multiplexers logic designs, inefficient implementation of multiplexers in hardware constructs will have a pronounced effect in terms of resource usage and execution speed.

Known techniques for implementing a multiplexer typically rely on some aspect of decoding a control signal being sent to the multiplexer in order to determine which of the input signals should be selected as an output. Thus, additional decoding circuitry is used and additional clock cycles are required for the decoding process to complete.

In one known approach, a multiplexer is implemented by using two lookup tables ("LUTs"), the outputs of which are sent into a logic gate that, in turn, outputs the output of the multiplexer. Two or more of such multiplexers may be used as inputs to another multiplexer to implement larger, more complex multiplexer. Such a "cascade" structure is described in Cliff et al. U.S. Pat. No. 5,258,668, issued Nov. 2, 1993. Cliff refers to the benefits attributed to using cascaded connections to couple elements in a programmable logic array using local connections as opposed to a device-wide interconnect. Fewer resources may be used and functions using the larger more complex elements may execute faster.

It would therefore be desirable to provide an improved implementation of a multiplexer to make use of the benefits afforded by a cascading arrangement of LUTs.

SUMMARY OF THE INVENTION

In view of the foregoing, it is therefore an object of the present invention to provide an improved implementation of a multiplexer to make use of the benefits afforded by a cascading arrangement of LUTs.

In order to avoid the drawbacks of currently known implementations of multiplexers (e.g., decoding circuitry for selection criteria that uses extra resources and extra clock cycles, using extra LUTs for implementing larger more complex multiplexers, as well as other inefficiencies in terms of resource usage and execution times), the present invention provides a more efficient structure of LUTs that are coupled using efficient cascading connections. The present invention further provides a selection encoding for each LUT that takes advantage of the more efficient structure.

For example, a single four-input LUT may be configured to implement a two-input (one-output) multiplexer by using two of the LUT's inputs as selection criterion signals and the other two inputs as input signals. One suitable selection encoding for such an arrangement is, for example, to output the first input signal, the second input signal, and a null signal when the first selection criterion signal is a first value and the second selection criterion is a second value, the first selection criterion signal is the second value and the second selection criterion is the first value, the first selection criterion is the second value and the second selection criterion is the second value, respectively. Any other suitable selection encoding may be used in accordance with such a LUT configuration.

In order to build larger, more complex multiplexers, two or more of the above LUTs may be coupled to one another using cascade connections. For example, to implement a four-input multiplexer, the outputs of two LUTs may be coupled to the inputs of a logic gate, such as an AND gate, the output of which is the output of the multiplexer. For a six-input multiplexer, a third LUT may be added, such that the output of the above logic gate and the output of the third LUT are coupled to inputs of a second logic gate, such as an AND gate, the output of which is the output of the multiplexer. For an eight-input multiplexer, a fourth LUT may be added to the six-input implementation described above, such that the output of the second logic gate and the output of the fourth LUT are coupled to the input of a third logic gate, such as an AND gate, the output of which is the output of the multiplexer. Such an arrangement may be expanded for any suitable size multiplexer.

One of the benefits of such an implementation of a multiplexer is the ability to use one-hot selection, whereby no decoding of the selection criteria is necessary thereby reducing execution time.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which.

DETAILED DESCRIPTION OF THE INVENTION

Figure 1:
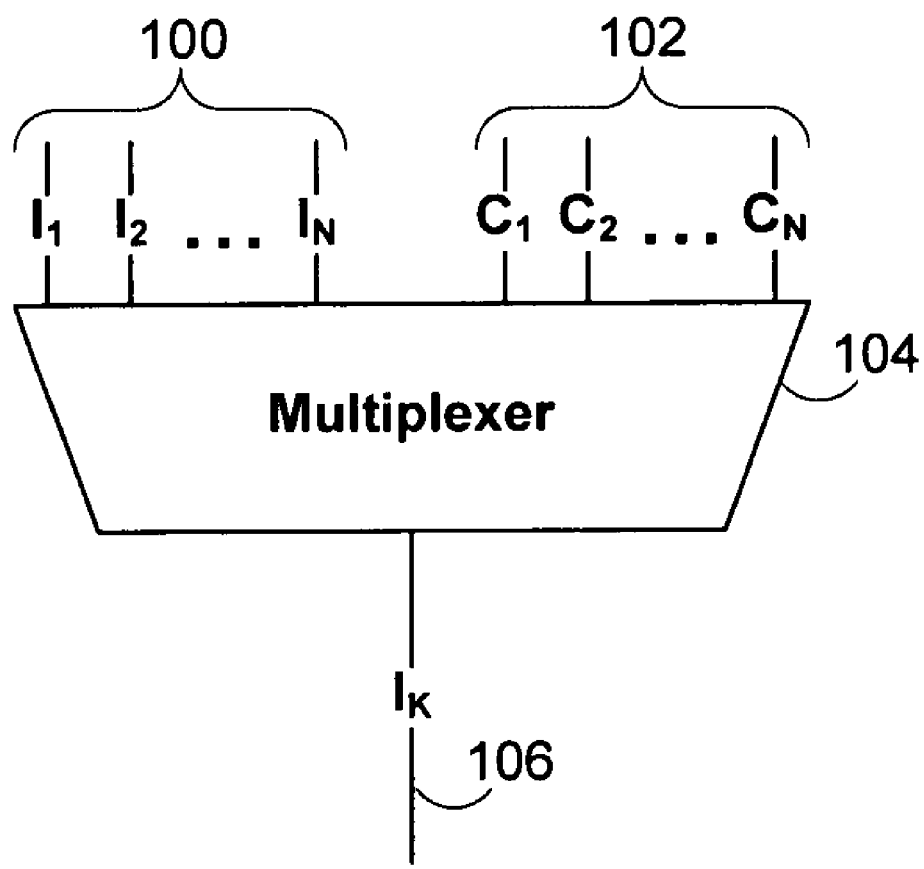
FIG. 1 is a an N-input multiplexer.

The present invention relates to multiplexers. A multiplexer, as the term is used herein, refers to a logic component that may be implemented in hardware, such as in a programmable logic device, an application specific integrated circuit ("ASIC"), any suitable hybrid device, or any other suitable device. With reference to FIG. 1, a multiplexer, such as multiplexer 104, takes as input N discrete inputs 100 where N>1. Each of inputs 100 is equal in size (i.e., bits) to one another. Multiplexer 104 also takes as input M control lines 102 where M>0. Multiplexer 104 outputs one and only one of the inputs of inputs 100. As illustrated, output 106 is $I_k$ where $0<k \leq N$. Every one of inputs 100 may be output via output 106 based on a unique value of control lines 102. Control lines 102 may use binary encoding or any other suitable type of encoding (e.g., hexadecimal).

Figure 2:
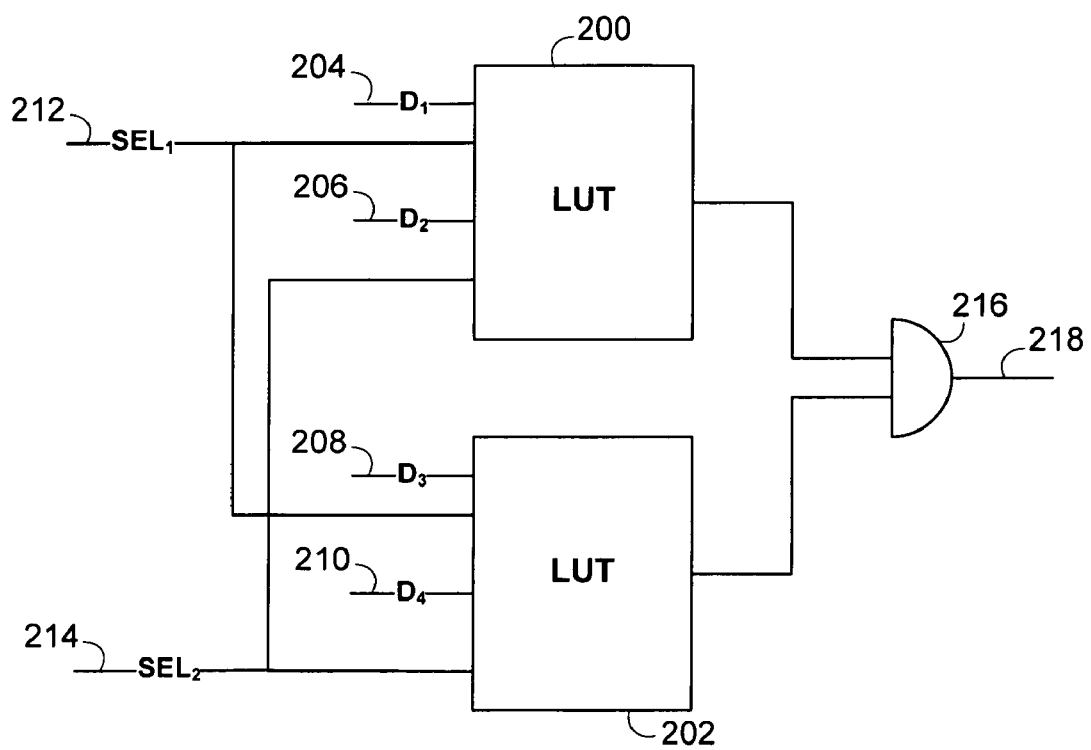
FIG. 2 is a schematic diagram of an implementation of a four-input multiplexer using two four-input LUTs.

Multiplexers are typically implemented in logic circuits using one or more lookup tables ("LUTs"). For example in the APEX™ family of programmable logic devices manufactured by Altera Corporation of San Jose, Calif., a multiplexer having four input lines is implemented using two four-input LUTs. This arrangement is illustrated in FIG. 2, in which LUTs 200 and 202 are used to implement multiplexer 300 of FIG. 3. Inputs 204, 206, 208, and 210, correspond to input lines 100 of FIG. 1. Inputs 212 and 214 provide control signals corresponding to control lines 102 of FIG. 1. The outputs of LUTs 200 and 202 are sent through AND gate 216 to produce multiplexer output 218. The following tables indicate the selection encoding typically used for such an arrangement for LUTs 200 and 202:

| $SEL_1$ | $SEL_2$ | OUTPUT (LUT 200) | OUTPUT (LUT 202) |
|---|---|---|---|
| 0 | 0 | $D_1$ | 1 |
| 0 | 1 | $D_2$ | 1 |
| 1 | 0 | 1 | $D_3$ |
| 1 | 1 | 1 | $D_4$ |

Figure 3:
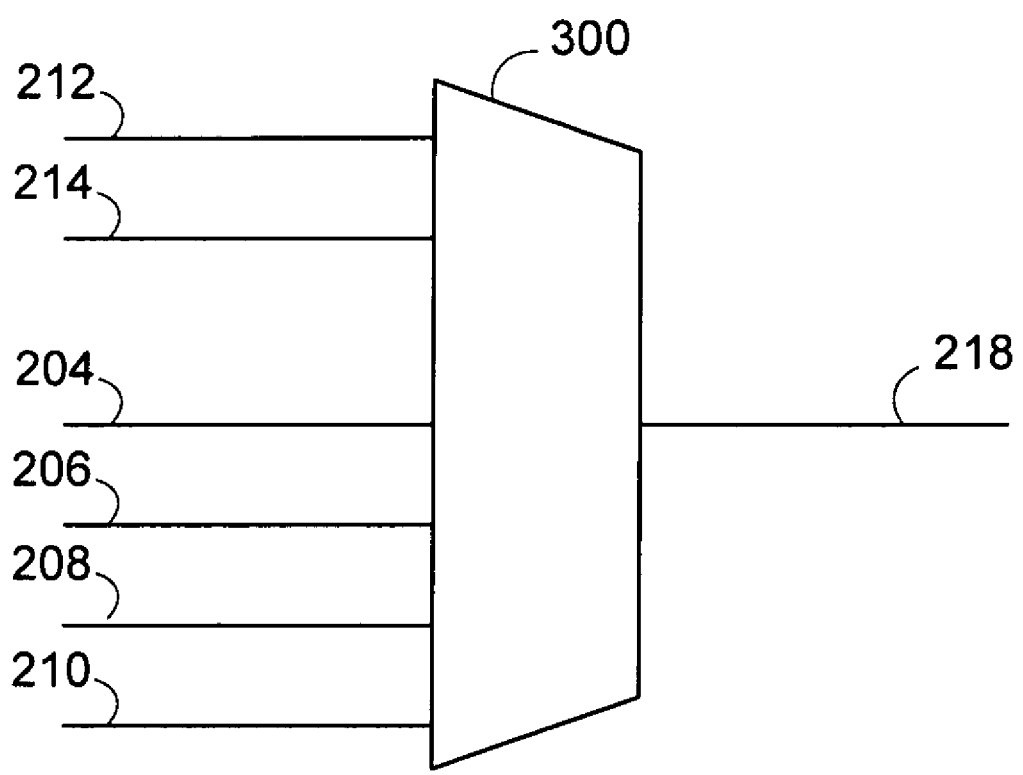
FIG. 3 is the multiplexer that the arrangement of FIG. 2 implements.
Figure 4:
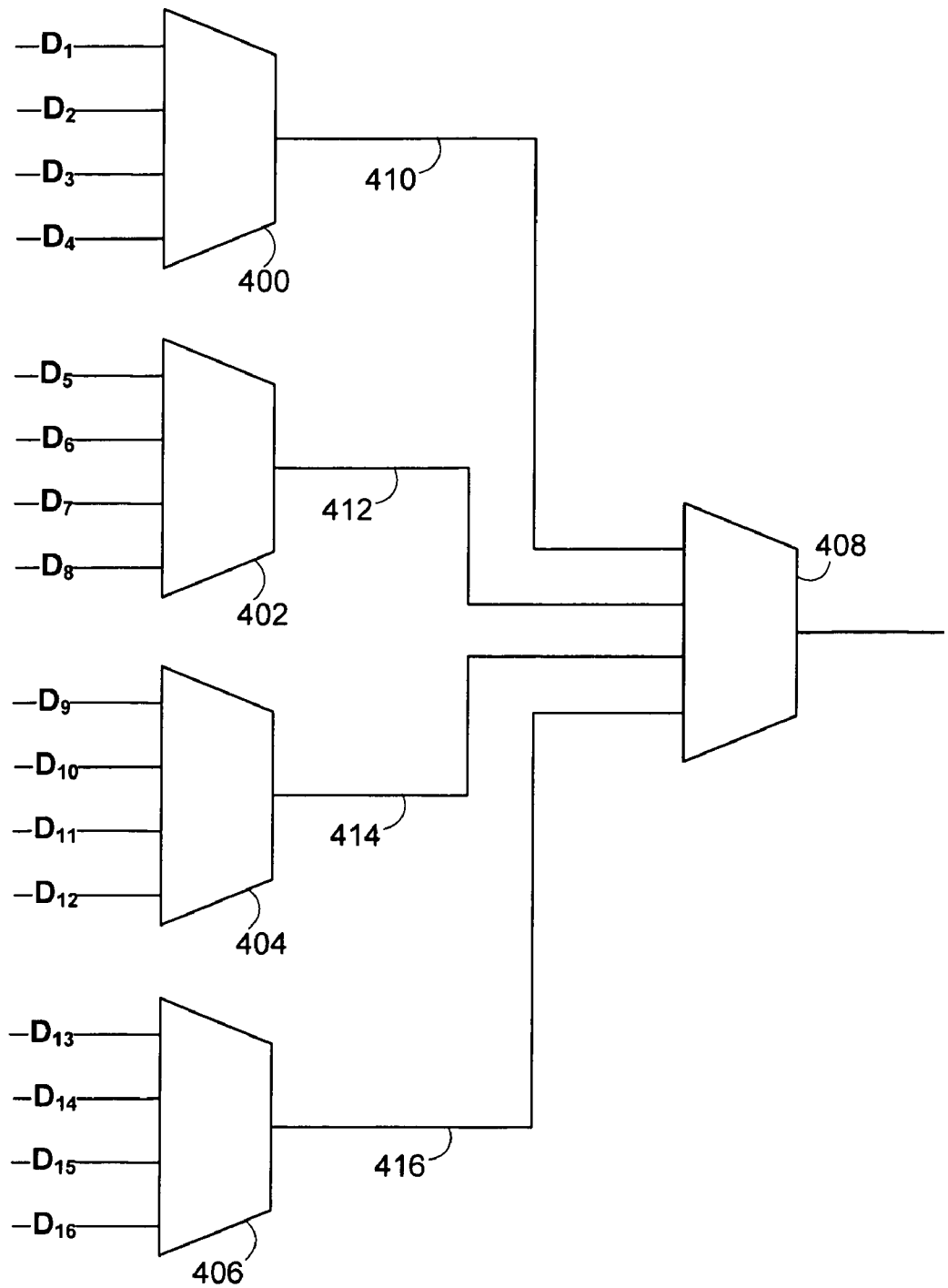
FIG. 4 is a schematic diagram of an implementation of a larger multiplexer using smaller multiplexers.

The selection encoding defined above limits the arrangement of FIG. 2 to two LUTs. In order to implement larger, more complex multiplexers, four-input multiplexers, such as multiplexer 300 of FIG. 3, are connected in a cascade arrangement to other four-input multiplexers. For example, as illustrated in FIG. 4, a 16-input multiplexer may be implemented by connecting to the inputs of a four-input multiplexer 408 outputs 410, 412, 414, and 416 from distinct four-input multiplexers 400, 402, 404, and 406, respectively.

One of the benefits of the arrangement of FIG. 2 is that faster routing and more efficient use of resources is accomplished by using AND gate 216 as opposed to another LUT with programmable wiring. However, as discussed above, the arrangement is limited to two LUTs and in order to implement larger multiplexers, additional circuitry (e.g., multiplexer 408) is necessary.

In order to avoid the need for additional circuitry, a different selection encoding may be used to allow more than two LUTs to be cascaded. For example, the arrangement illustrated in FIG. 5 would be desirable for use in implementing an eight-input multiplexer. LUTs 502, 504, 506, and 508 are coupled using cascading connections 500. Cascading connections 500 are made by sending the outputs of LUT 502 and LUT 504 into a logic gate, such as AND gate 514 (although any other suitable logic gate may be used, such as an OR gate, for example). The outputs of AND gate 514 and LUT 506 are sent into AND gate 516. The outputs of AND gate 516 and LUT 508 are sent into AND gate 518. The output of AND gate 518 is the output of the multiplexer.

Figure 5:
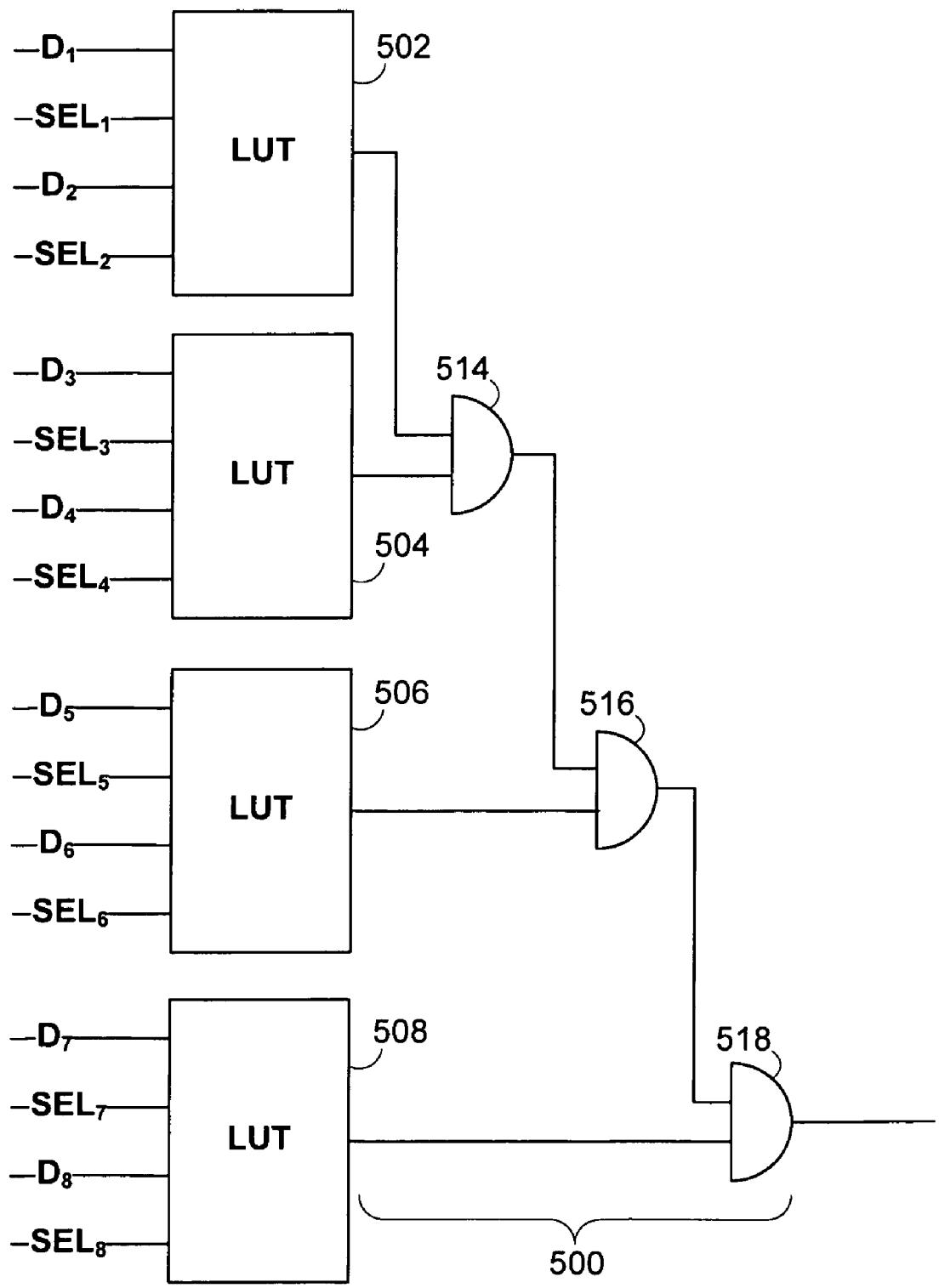
FIG. 5 is a schematic diagram illustrating a more efficient implementation of a multiplexer in accordance with one embodiment of the present invention.
Figure 6:
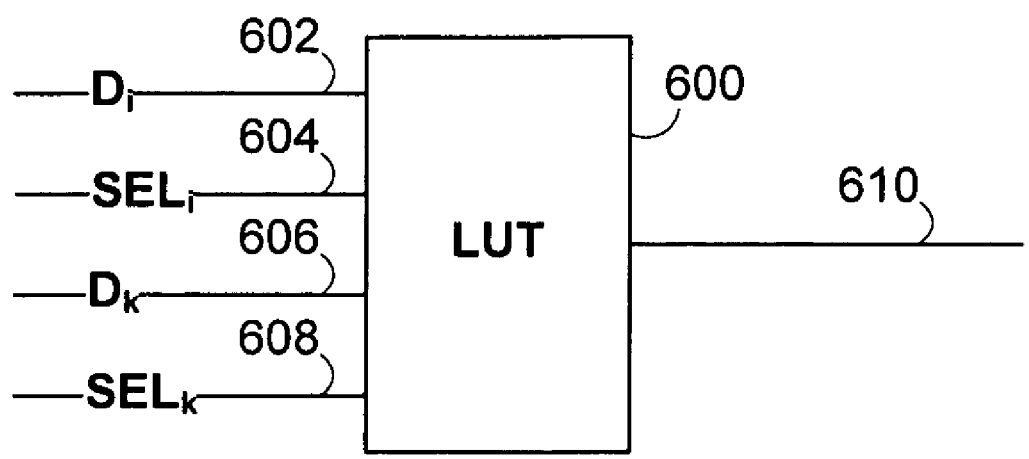
FIG. 6 is a generic LUT from the schematic diagram of FIG. 5.

FIG. 6 is a schematic diagram of a generic LUT 600 that may be used in implementing a multiplexer having at least input lines 602 and 606 and control lines 604 and 608 according to the cascading arrangement described with reference with to FIG. 5. LUT output 610 may be used as an input into an AND gate or may serve as the multiplexer output depending on where in the cascade structure LUT 600 is placed. The following table provides one suitable selection encoding that may be used in connection with LUT 600:

| $SEL_i$ | $SEL_k$ | OUTPUT |
|---|---|---|
| 0 | 0 | 1 |
| 0 | 1 | $D_k$ |
| 1 | 0 | $D_i$ |

This selection encoding is merely illustrative. Any other suitable selection encoding may be used in accordance with the implementation of a multiplexer based on the arrangement illustrated in FIG. 5.

The multiplexer of FIG. 5 allows for one-hot selection (i.e., does not require intervening circuitry to decode control signals). It will further be apparent that multiplexers having greater than four input lines implemented in accordance with the structures and encoding of FIGS. 5 and 6 will typically be smaller than multiplexers implemented according to the structure of FIG. 4. It will further be apparent that multiplexers having up to 12 input lines implemented in accordance with the structures and encoding of FIGS. 5 and 6 will typically be faster than multiplexers implemented according to the structure of FIG. 4.

Figure 7:
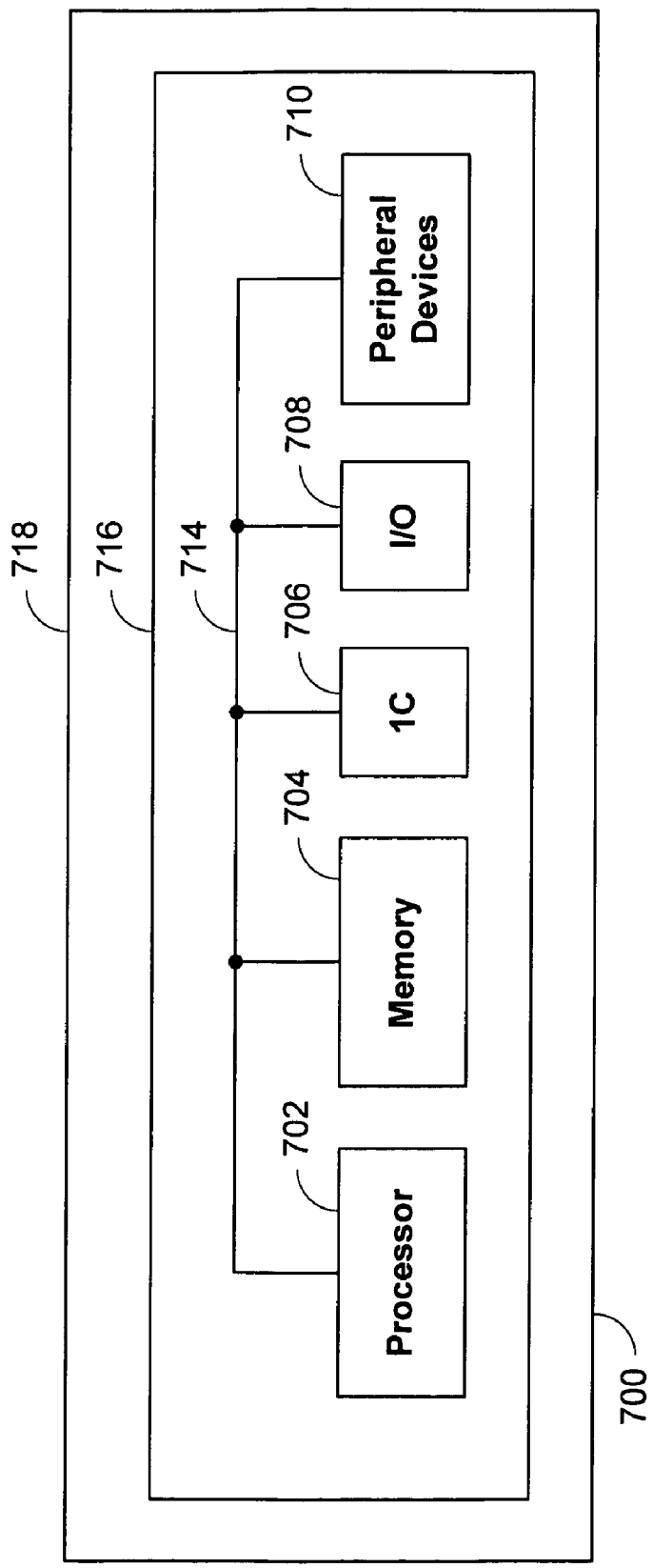
FIG. 7 is a simplified block diagram of an illustrative system employing an integrated circuit device in accordance with one embodiment of the present invention.

FIG. 7 illustrates an integrated circuit device 706 in accordance with this invention in a data processing system 700. In addition to device 706, data processing system 700 may include one or more of the following components: a processor 702; memory 704; I/O circuitry 708; and peripheral devices 710. These components are coupled together by a system bus 714 and are populated on a printed circuit board 716 which is contained in an end-user system 718.

Integrated circuit device 706 may be any suitable programmable logic device (such as an FPGA), ASIC device, a hybrid of such devices, or any other suitable integrated circuit device.

System 700 may be used in a wide variety of applications, such as computer networking, data networking, instrumentation, video processing, digital signal processing, or any other suitable. Device 706 may be used to perform a variety of different logic functions. For example, device 706 may be configured as a processor or controller that works in cooperation with processor 702. Device 706 may also be used as an arbiter for arbitrating access to a shared resource in system 700. In yet another example, device 706 may be configured as an interface between processor 702 and one of the other components in system 700. It should be noted that system 700 is only exemplary, and that the true scope and spirit of the invention should be indicated by the following claims.

Thus, an improved implementation of a multiplexer in integrated circuitry is provided. One skilled in the art will appreciate that the present invention can be practiced by other than the described embodiments, which are presented for purposes of illustration and not of limitation, and the present invention is limited only by the claims which follow.

What is claimed is:

1. Circuitry for implementing a multiplexer, the circuitry comprising:
    a first lookup table having four inputs and a single output, the first lookup table configured to:
    take as an input a first selection criterion signal and a second selection criterion signal,
    take as an input a first input signal and a second input signal, and
    output the first input signal, the second input signal, and a null signal when the first selection criterion signal is a first value and the second selection criterion is a second value, the first selection criterion signal is the second value and the second selection criterion is the first value, the first selection criterion is the second value and the second selection criterion is the second value, respectively;
    a second lookup table configured in a way as the first lookup table is configured;
    a logic gate, wherein the logic gate takes as input an output of the first lookup table and of the second lookup table; at least one additional logic gate; and at least one additional lookup table, wherein an output of each of the at least one additional lookup table is input to a distinct and respective one of the at least one additional logic gate and wherein each of the at least one additional logic gate takes as input an output of a preceding logic gate, an output of a last of the at least one additional logic gate being an output of the multiplexer.

2. The circuitry of claim 1 wherein the logic gate is an AND gate.

3. The circuitry of claim 1 wherein the logic gate is an OR gate.

4. The circuitry of claim 1 wherein the multiplexer is a four-input multiplexer.

5. A method for implementing a multiplexer in circuitry comprising a first lookup table having four inputs and a single output, the method comprising:
   configuring the first lookup table to:
   take as an input a first selection criterion signal and a second selection criterion signal,
   take as an input a first input signal and a second input signal, and
   output the first input signal, the second input signal, and a null signal when the first selection criterion signal is a first value and the second selection criterion is a second value, the first selection criterion signal is the second value and the second selection criterion is the first value, the first selection criterion is the second value and the second selection criterion is the second value, respectively;
   configuring a second lookup table in a way as the first lookup table is configured;
   configuring a logic gate to take as input an output of the first lookup table and of the second lookup table; and
   making the multiplexer larger by coupling at least one additional lookup table to the first and second lookup tables using cascading connections, the cascading connections comprising at least one additional logic gate, wherein an output of each of the at least one additional lookup table is input to a distinct and respective one of the at least one additional logic gate and wherein each of the at least one additional logic gate takes as input an output of a preceding logic gate, an output of a last of the at least one additional logic gate being an output of the multiplexer.

6. The method of claim 5 wherein configuring the logic gate comprises configuring an AND gate.

7. The method of claim 5 wherein configuring the logic gate comprises configuring an OR gate.

8. The method of claim 5 wherein implementing the multiplexer comprises implementing a four-input multiplexer.

9. A digital processing system comprising:
   processing circuitry;
   a memory coupled to said processing circuitry; and
   circuitry as defined in claim 1 coupled to the processing circuitry and the memory.

10. A printed circuit board on which is mounted circuitry as defined in claim 1.

11. The printed circuit board defined in claim 10 further comprising:
    a memory mounted on the printed circuit board and coupled to the memory circuitry.

12. The printed circuit board defined in claim 10 further comprising:
    processing circuitry mounted on the printed circuit board and coupled to the memory circuitry.

\* \* \* \* \*